May 27, 1958    R. H. SCHMUCK    2,835,973
THREE DIMENSIONAL SEISMIC COMPUTER
Filed Aug. 15, 1955    4 Sheets-Sheet 1

INVENTOR.
Rudolph H. Schmuck,
BY Frank S. Ewidl
ATTORNEY.

INVENTOR.
Rudolph H. Schmuck,
BY Frank S. Tisdll
ATTORNEY.

May 27, 1958  R. H. SCHMUCK  2,835,973
THREE DIMENSIONAL SEISMIC COMPUTER
Filed Aug. 15, 1955  4 Sheets-Sheet 3

INVENTOR.
Rudolph H. Schmuck.
BY
Frank S. Troidl
ATTORNEY.

May 27, 1958  R. H. SCHMUCK  2,835,973
THREE DIMENSIONAL SEISMIC COMPUTER
Filed Aug. 15, 1955  4 Sheets-Sheet 4

INVENTOR.
Rudolph H. Schmuck,
BY Frank S. Tiedl
ATTORNEY.

United States Patent Office 2,835,973
Patented May 27, 1958

---

2,835,973

THREE DIMENSIONAL SEISMIC COMPUTER

Rudolph H. Schmuck, Houston, Tex., assignor, by mesne assignments, to Esso Research and Engineering Company, Elizabeth, N. J., a corporation of Delaware Application August 15, 1955, Serial No. 528,164

4 Claims. (Cl. 33—1)

This invention relates to the solving of three dimensional problems. More particularly this invention relates to the determination of the spatial location of a solid plane.

One of the procedures utilized in discovering new sources of valuable minerals, such as oil, is the procedure which is commonly referred to as seismic prospecting. This procedure consists of shooting off dynamite or of dropping a weight on the ground at a location called the "shot point" to thereby cause the emanation of seismic waves from the "shot point." The seismic waves are reflected from subsurface boundaries at which a change of acoustic impedance occurs, according to Snell's laws of reflection and refraction and detected at the surface by seismometers which are spaced from the shot point. The location of the reflecting boundary is then determined from the data obtained from the seismic records obtained from the voltage produced by the seismometer as a result of the impinging seismic waves.

My new computer is designed in its more specific aspect to solve the problem of locating the spatial location of a reflecting subsurface, and its dip and strike, from data obtained from seismic prospecting. The data obtained from the computer is plotted on what is called a subsurface profile. From these plotted reflections a geophysicist or geologist gets an indication of the subsurface structure and from this subsurface structure obtains clues as to the possible location of oil or gas reservoirs before advising the petroleum engineers to drill a borehole at a specific location.

In its broader aspect my new computer may be utilized for the solution of many three-dimensional problems given certain data.

Computers have been designed and are utilized for determining the dip of various subsurface formations from data obtained by sources other than seismic prospecting. For example, a computer has been designed by Hildebrandt and patented in United States Patent No. 2,615,248 issued October 28, 1952 for computing the dip of a subsurface formation from data obtained from a dipmeter which is lowered into a borehole. However, I am the first to invent a three dimensional computer for the solving of the dip and strike, depth and distance from a reference point, of a subsurface boundary from data obtained from seismic prospecting.

In the seismic art one of the procedures followed is to place what are called seismic spreads which radiate from a shot point, which is the point from which seismic waves are caused to emanate. These seismic spreads consist of a series of seismometers generally equally spaced and utilized to detect the reflected seismic energy. The location of the shot point, the azimuthal direction of each spread, and the length of each spread, are known. If the reflecting boundary is horizontal, that is, has no dip, the travel time of the seismic wave to each of two seismometers equally distant from the shot point will be equivalent. If, however, the reflecting boundary is dipping it will take longer for the seismic wave to reach the seismometer which is located down dip. The difference in the travel time is commonly referred to in the industry as the $\Delta t$. For example, if a seismometer is located at one side of the shot point 100 feet from the shot point and a second seismometer is located 100 feet on the other side of the shot point, if the time for the first seismometer to detect reflected seismic waves is $t_1$ and a greater time $t_2$ is required for the seismic wave to be detected by the second seismometer the $\Delta t = t_2 - t_1$. This $\Delta t$ can be determined from the seismic records obtained from the seismometers in the spreads.

The manner of operation of the new three-dimensional computer, its advantages and the reasons for operating efficiently will become clearer during the course of the following description and drawings wherein Fig. 1 shows the geometrical reasons for the proper operation of my new three-dimensional computer;

Figure 1:
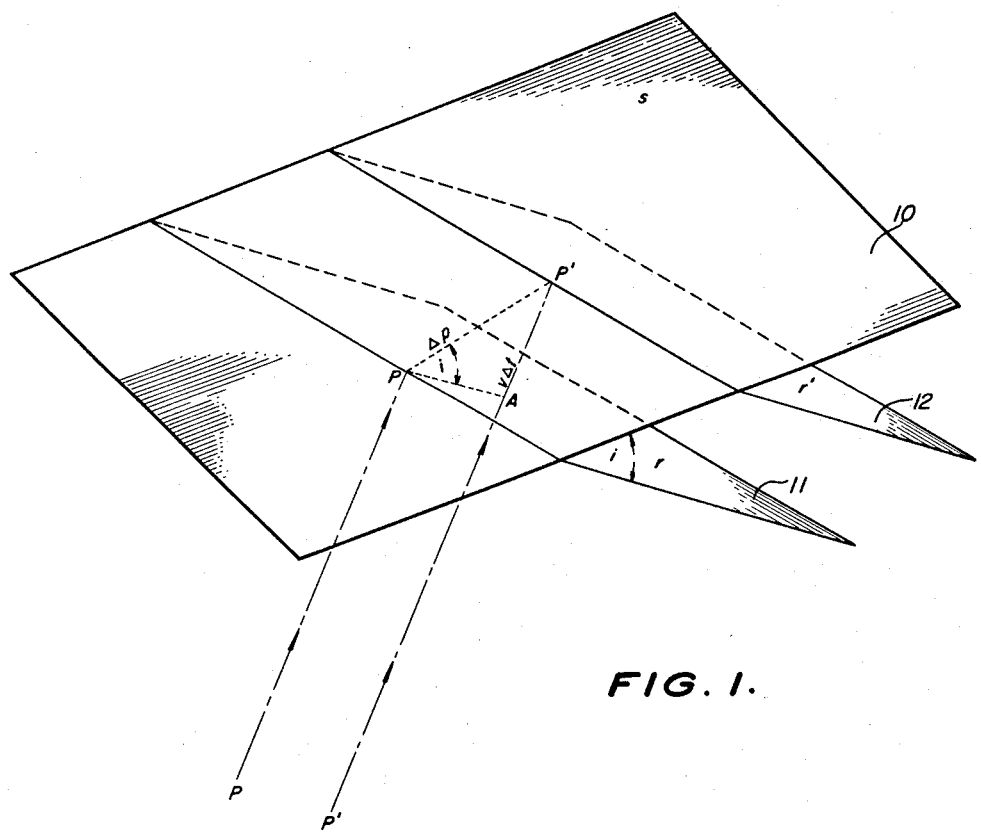

Referring to Fig. 1 the plane surface 10 represents the earth's surface. Planes 11 and 12 represent the seismic wave fronts at various times with plane surface 11 representing the wave front at a particular time and plane surface 12 representing the wave front at a time $\Delta t$ later. Lines PP and P'P' represent wave paths. By definition, the emergence angle $i$ of the seismic waves is the dihedral angle formed by the planes 11 or 12 with the earth's surface 10 as shown. The emergence angle $i$ is equal to the angle of dip of the reflecting subsurface which caused the reflected wave fronts 11 and 12.

If a seismic spread is directed along the line PP', that is along the direction of greatest $\Delta t$, the seismic spread would be located along the direction of dip of the reflecting boundary. We see from the geometry that:

(1) $$\sin i = v \frac{\Delta t}{\Delta p}$$

where $v$ is equal to the velocity of the medium and where $\Delta p$ is the total distance of the spread.

The velocity of the medium may be determined by means of various velocity surveying means such as a long seismometer spread or a velocity logger. $\Delta p$ is measured in feet on the earth's surface.

The triangle PP'A is perpendicular to the wave front 11 when the seismic spread is along PP' or along the greatest $\Delta t$.

Figs. 2 through 8 show my new instrument which is utilized in solving the location of the subsurface reflecting boundary from seismic data. The numeral 20 is a base member having an azimuth scale 21 on its outer portion. Mounted at the center of the base 20 is a shaft 22 which extends upward from the center of base 20. This center of the base represents the shot point. Also mounted upon the shaft 22 are a plurality of horizontal arms 23. These horizontal arms are rotatably attached to the shaft member 22 by means of rings 24 which rotate about the shaft 22 with each horizontal arm having two rings. Each of the horizontal arms is graduated in terms of distance. In the preferred modification shown, the horizontal arms are so graduated as to indicate 1″ for each 600′.

Slidably mounted on each horizontal arm is a rider member 25. The rider member has a screw 30 which fits into a pressure pad 31 as shown more clearly in Fig. 5. The rider member 25 may be moved along the horizontal arms by unscrewing screw 30 and moving the rider arm longitudinally along the horizontal arm. The rider arm may then be located in its new position by tightening the screw 30 against pressure pad 31. An index 32 is provided on rider member 25 to show the graduated distance. The distance marked on each horizontal arm 23 indicates the distance of a particular seismic spread and the azimuth scale on the base 20 indicates the azimuthal direction of the seismic spread. This direction is indicated by an index 26 located on each of the horizontal arms near the outer extremity of said horizontal arms. The horizontal arms may be locked in their proper positions by means of set screws 27.

Connected to each of the riders 25 is a tube 60. Telescoping into each tube 60 is an extension member 60′ having a groove 28 formed therein. A set screw 29 is provided in each of the tubular members 60 with the set screw 29 being adapted to fit into the slots 28 of the extensible member 60′ so as to permit the locking of the extensible member 60′ to any desired extended position. The extensible members 60′ are graduated in terms of the $\Delta t$, the uppermost extremity of the tube 60 serving to index the graduation of the extensible member 60′. In the preferred modification the graduations of the extensible members are so graduated as to indicate 1″ for each .030 second. The extremities of all of the tubes 60 which serve to index the extensible member lie in the same horizontal plane. They, therefore, represent a plane of no dip or zero $\Delta t$ with the magnitude of the extension of a particular extensible member 60′ being indicative and proportional to the $\Delta t$ of a reflecting seismic event which has been detected by a seismometer spaced a certain distance from the shot point, which distance is indicated by the position of the rider member 25 on the distance calibrated arms 23. The uppermost extremities of the extensible member 60′ are tapered as at 50 to provide for a better surface upon which a plate 40 may rest.

Figure 7:
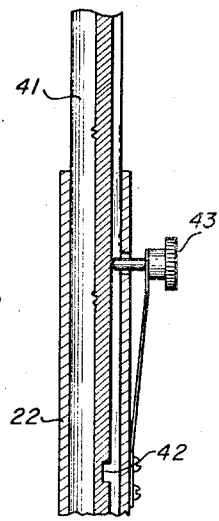
Fig. 7 is a fragmentary view showing another portion of the device.

In order to provide for easy access to extensible members 60′ to adjust the members 60′ to their proper position the centrally located shaft 22 is provided with an extensible member 41, which extensible member is provided with a notch 42 (Fig. 7). A spring biased lock screw 43 is attached to the shaft 22 and adapted to fit into the notch 42 when the shaft extension member 41 has been extended. When the shaft extension member 41 has been extended and locked the operator has access to the vertical arms.

Figure 2:
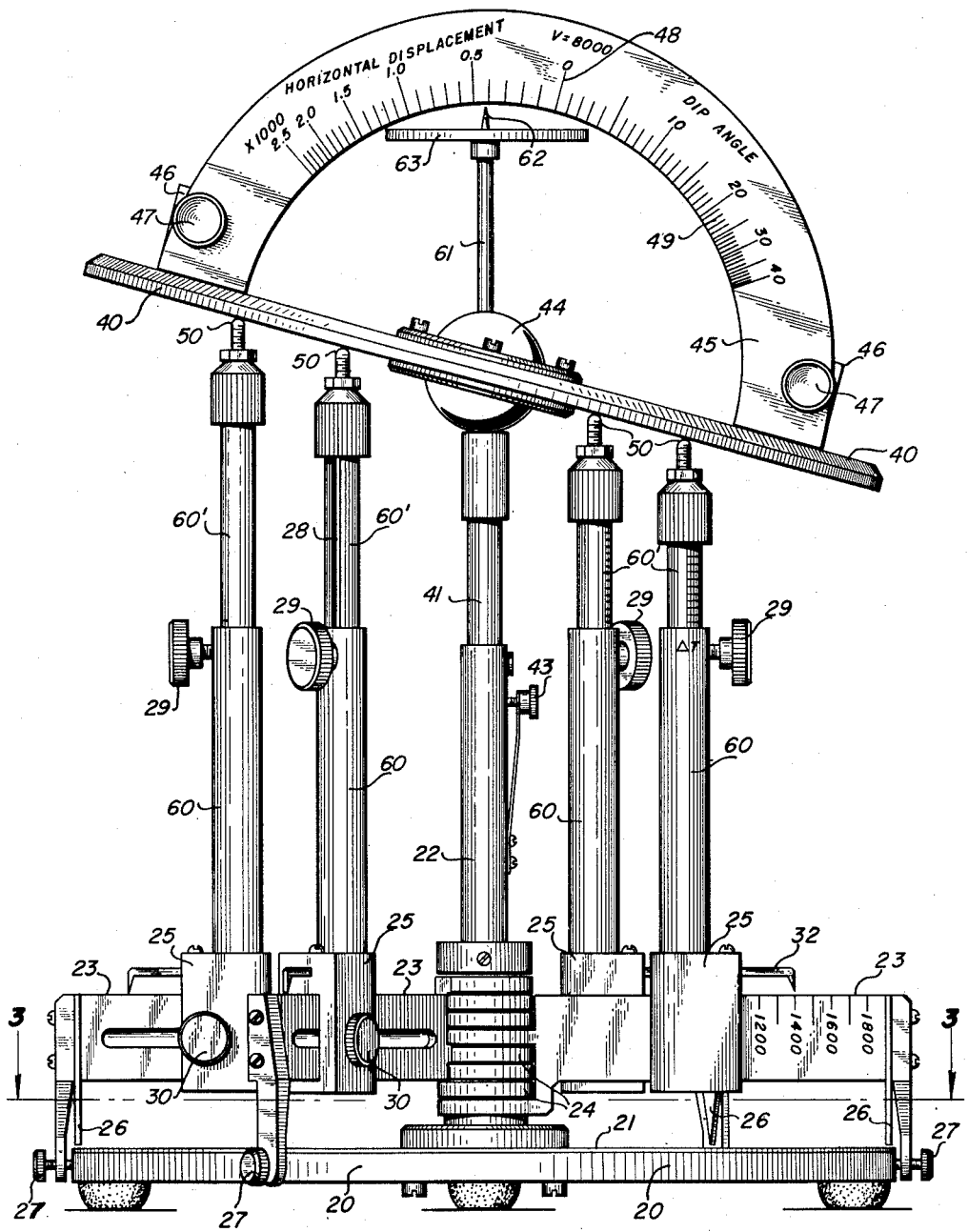
Fig. 2 is a side view in elevation of the apparatus of the present invention.
Figure 3:
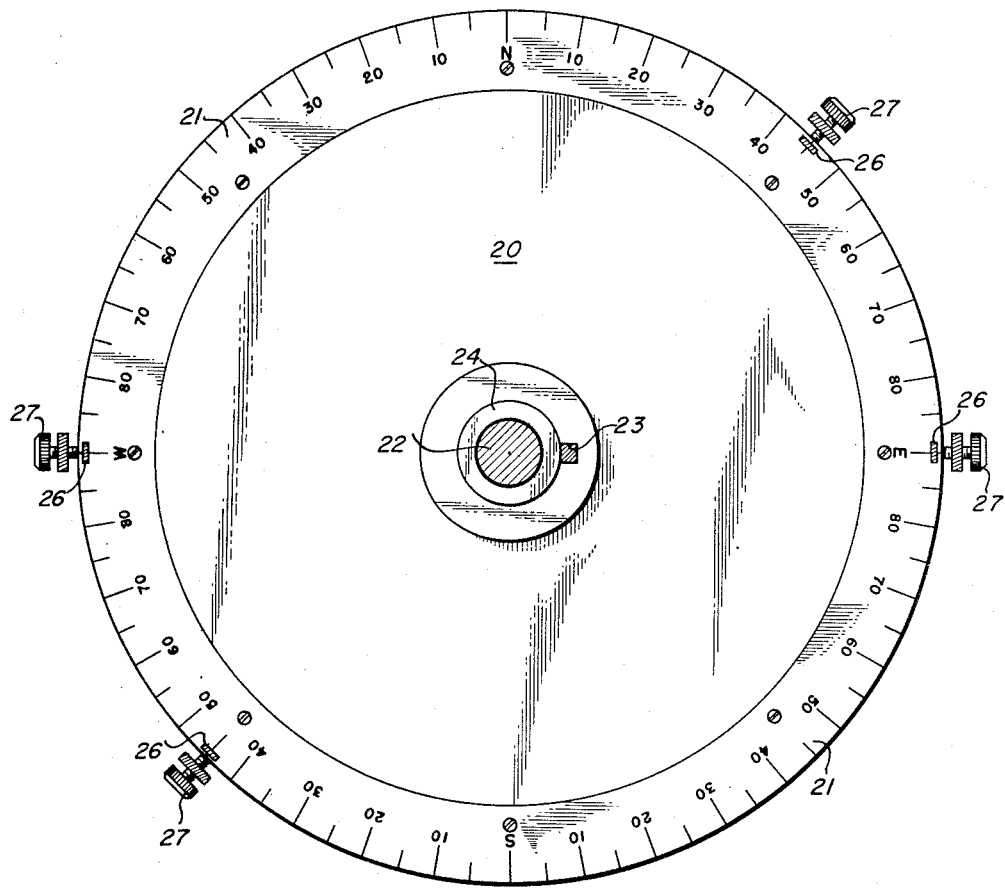
Fig. 3 is a view partly in section taken along the line 3—3 of Fig. 2.
Figure 4:
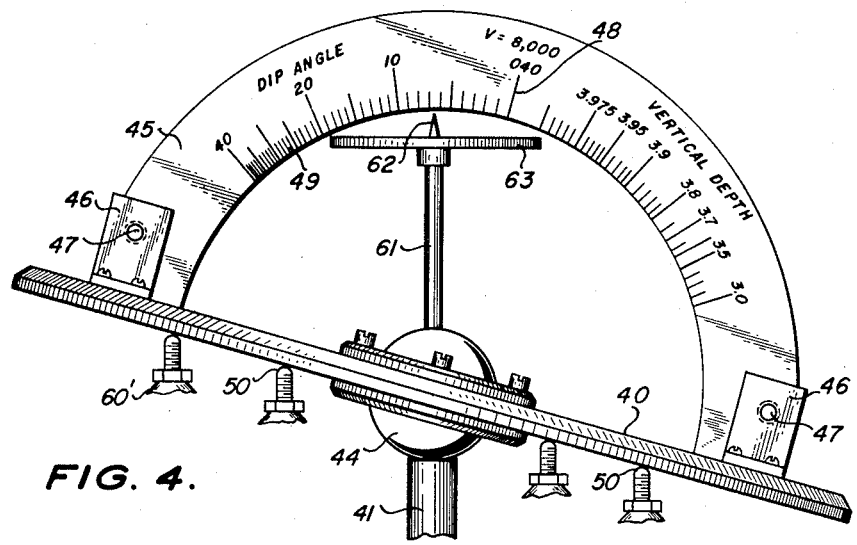
Fig. 4 is a fragmentary view of the upper plate of Fig. 2 rotated 180°.
Figure 8:
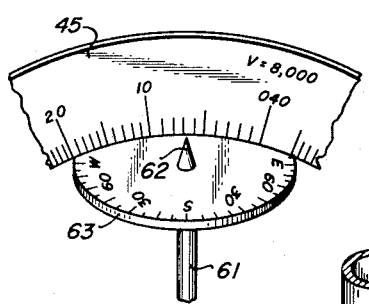
Fig. 8 is a fragmentary view showing the upper azimuth plate assembly.
Figure 5:
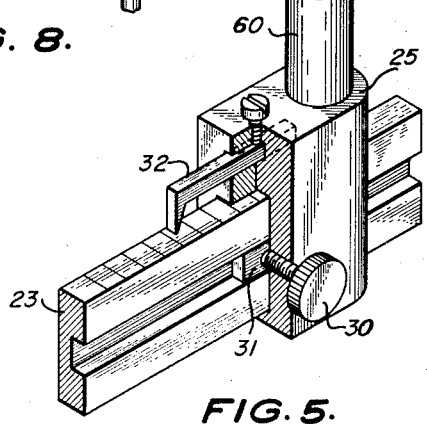
Fig. 5 is a fragmentary view showing details of the displacement rider lock assembly.
Figure 6:
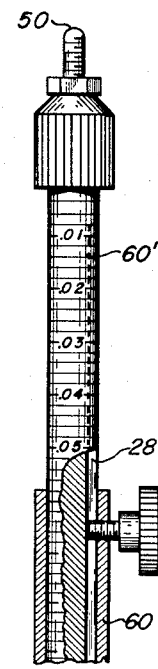
Fig. 6 is a fragmentary view showing another portion of the device.

Integrally and rigidly connected to the shaft extension member 41 is a sphere 44. Mounted upon sphere 44 is the plate member 40. The plate member 40 is mounted so as to permit the rotation and/or turning of the plate member 40 about the axis of the centrally located shaft 22. Detachably attached to the plate member 40 along the diameter of plate member 40 is an arc member 45. The arc member 45 is mounted upon the member 40 by means of L shaped members 46 and screws 47. The arc member 45 is calibrated in a particular manner as shown in Figs. 2 and 4. Fig. 2 shows the calibrations of one side of the arc member 45 and Fig. 4 shows the calibrations of the other side of arc member 45. Both sides of the arc member 45 have a zero mark shown at 48 and both sides are calibrated in terms of the dip angle of the reflecting boundary as shown at 49. The graduations on one side of the arc member 45 show, in addition to the dip angle, the horizontal displacement of a reflection point on the reflecting boundary from the shot point; the graduations on the other side of arc member 45 include graduations showing the vertical depth below the surface of the earth of a reflecting point on the reflecting boundary.

The graduations of the dip angle scale are obtained as follows: a horizontal scale of 1″ equals 600′ and a vertical scale of 1″ equals .030 second has been assumed, as noted supra. Letting $\alpha$ be the physical angle of the tilt of the plate 40 then (2) $$\tan \alpha = K \frac{\Delta t}{\Delta p}$$

where K is the constant of proportionality. With the horizontal and vertical scale graduations assumed, $K=20{,}000$ feet per second. But as given in Equation 1, (3) $$\sin i = v \frac{\Delta t}{\Delta p}$$

or $$\frac{\Delta t}{\Delta p} = \frac{1}{v} \sin i$$

substituting in the above Equation 2 for $$\frac{\Delta t}{\Delta p}$$

(4) $$\tan \alpha = \frac{k}{v} \sin i$$

or $$\sin i = \frac{v}{k} \tan \alpha$$

To obtain the scale readings of the dip angle scale, a range of values for $\alpha$ is chosen and the angle $i$ is determined and designated on the dip scale for each of the values of $\alpha$. $v$, as noted on the drawing, was selected at 8,000 feet per second.

Figure 9:
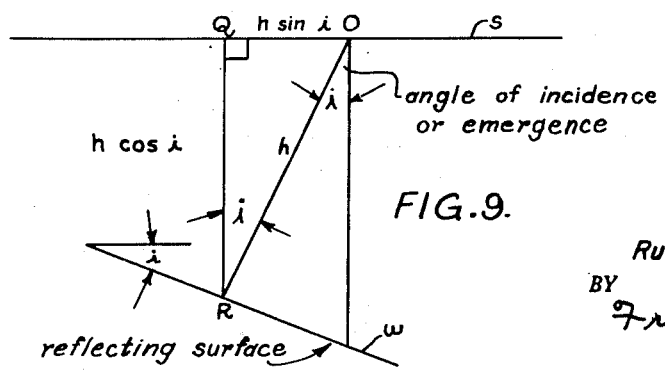
Fig. 9 is a schematic illustration upon which the scale graduation determinations are based.

For determination of the scale for the vertical depth and horizontal distance, reference is made to Fig. 9 wherein line S designates the horizontal plane of the earth's surface and W designates the reflecting 3-dimensional surface. O designates the shot point, Q represents a reference point on the earth's surface and R represents a point of the reflecting surface vertically below point Q. The angle $i$ designates the angle of emergence which equals the angle of dip. The line QR has been designated $h$. Thus it is seen that (5) The horizontal distance $OQ = h \sin i$ and (6) The vertical depth $QR = h \cos i$; however $$h = \frac{vt_0}{2}$$

where $t_0$ is the time where $p=0$. Thus substituting for $h$ in Equations 5 and 6 respectively (7) $$OQ = \frac{vt_0}{2} \sin i$$

or $$\sin i = \frac{2OQ}{vt_0}$$

and (8) $$QR = \frac{vt_0}{2} \cos i$$

or $$\cos i = \frac{2QR}{vt_0}$$

Substituting sin $i$ of Equation 7 in Equation 4

(9)
$$\tan \alpha = \frac{2k(OQ)}{vvt_0}$$

or $$OQ = \frac{v^2 t_0 \tan \alpha}{2k}$$

To obtain the scale graduations of the horizontal distance, a range of values is substituted into this equation and various values of OQ are obtained which are plotted on the horizontal distance scale. In making these substitutions $t_0$ is assumed to be equal to one second. Thus, in use of this scale, the value shown on the scale is multiplied by the actual fractions of seconds as explained supra.

For the vertical depth QR from Equation 8

(10)
$$\cos^2 i = \frac{4(QR)^2}{v^2 t_0^2} = 1 - \sin^2 i$$

or $$\sin^2 i = 1 - \frac{4(QR)^2}{v^2 t_0^2}$$

Substituting $\sin^2 i$ of Equation 10 in Equation 4 squared

(11)
$$\tan^2 \alpha = \frac{k^2}{v^2} \left[ 1 - \frac{4(QR)^2}{v^2 t_0^2} \right]$$

and

(12)
$$QR = \frac{vt_0}{2} \times \sqrt{1 - \frac{v^2}{k^2} \tan^2 \alpha}$$

As in the previous equations, various ranges of values of $\alpha$ are substituted into Equation 12 and the values of QR derived therefrom are plotted on the vertical depth scale. As in the horizontal distance scale determination, $t_0$ is assumed equal to one second; hence, to arrive at the correct vertical depth, the value on the scale is multiplied by the actual fractions of seconds.

Connected to the spherical member 44 is a pointer 61 which is tapered at its upper end 62 to form an indicator. The pointer 61 is attached to the sphere 44 in a manner so as to remain rigidly along the same axis as members 22 and 41. The pointer member 61 is the axis of a second azimuth plate 63 which is mounted just below the tapering indicator 62. The second plate member 63 also has an azimuth scale formed thereon which is aligned with the azimuth scale on the base member 20.

To explain the operation of the new apparatus let it be assumed that four seismic spreads were utilized in obtaining seismic data. Further, let it be assumed the length of the spreads were 1000 feet and that the spreads were located 90° apart in azimuth. The operator would first move the rider arms 25 to the 1000 feet graduation indicated on each of the horizontal arms 23 and rotate each horizontal arm about the azimuth 21 on base 20 until the horizontal arm is in the proper azimuthal direction, as indicated by index 26 on each horizontal arm. The horizontal arms are then locked by means of set screws 27. The use of four spreads, of course, identifies four points on the reflecting subsurface boundary and hence provides for accurate determination of the spatial location of said boundary. However, it should be understood that three movable arms or in some cases even two might be effectively utilized to properly locate the subsurface reflecting boundary. In this latter case where only two movable arms are employed to obtain the true angle of dip and not the apparent angle of dip, the two movable arms must not be aligned, that is, that they must be at an angle to each other. It should be understood also that even though in our hypothetical example we assume the spreads are 90° apart these spreads might be separated from one another by any azimuthal angle. These spreads also may be positioned any desired distance from the shot point. In the example, 1000 feet was assumed to be the length of the spreads. However, obviously the positioning of the spreads may be made any radial distance from the shot point.

Quite often the terrain does not permit the seismic crew to place the spreads in convenient positions such as the 90° positions. In such instances they may be limited to the use of less than four spreads. They might also use azimuth of separations of said spreads which are not 90°. The use of rotatable horizontal arms 23, therefore, permits any particular seismic spread arrangement to be put into the new computer.

After the rider members have been set properly upon the horizontal arms 23 the extensible member 60' which represents zero $\Delta t$ is lowered until it sets upon the upper extremity of its tubular member 60. The other extensible members 60' are adjusted until the proper $\Delta t$ for the corresponding seismic spread as indicated by the $\Delta t$ graduations on the extensible members 60' is put into the instrument. The lock screw 43 is then removed against the bias of its spring and the plate 40 permitted to rest upon each of the extensible members 60'. In order to properly locate the subsurface reflecting boundary it is necessary that the plate member 40 be placed in the position of greatest $\Delta t$. This is clear from a consideration of the geometry shown in Fig. 1. In order to locate properly the subsurface reflecting boundary therefore, the plate member 40 is rotated until the pointer 61 is along the same vertical plane as arc member 45. The operator then reads the dip angle directly from arc member 45 and the direction of dip directly from the second azimuth plate 63. The operator then revolves plate member 40 through 180° until the indicator 62 is again directly below arc member 45. The operator can then obtain the vertical depth and horizontal displacement from the shot point of the reflection point, by multiplying these respective values by the shot point time in seconds.

The dip angles, vertical depth and horizontal displacement graduations depend upon the particular velocity of the seismic waves through the medium in the area where the subsurface boundaries are located. A different arc member 45 may be utilized therefore, for different velocities.

Though the new computer was specifically designed to solve seismic problems it is to be understood that this computer may be used for other three-dimensional problems. For example, it might be used for solving the dip of a boundary which has been traversed by three or more spaced bore-holes.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What I claim is:

1. In an apparatus for determining the spatial location of a three dimensional body with respect to a particular horizontal plane and a particular vertical line: a base having an azimuth scale thereon; a shaft on said base and perpendicular thereto representing a vertical line through a point on said horizontal plane; a plurality of means rotatably connected to said shaft for representing other vertical lines of known azimuth and distance from said vertical line, each of said rotatable means being rotatable relative to each other whereby desired azimuthal positions of each of said rotatable means may be assumed; vertically extensible radially movable means carried by each of said rotatable means for representing points on said three dimensional body which are spaced vertically from a reference horizontal plane to thus establish the tilt from the horizontal of said three dimensional body and means mounted on said vertically extensible means representing said body and including scale means for indicating the angle of tilt of said body and for determining the horizontal distance of a point on said body from said vertical line and the vertical distance of said point from said particular horizontal plane.

2. In an apparatus for determining the location of a subsurface geologic formation boundary from seismic data obtained from seismic prospecting utilizing a shot point and seismic spreads: a base having an azimuth scale thereon; a shaft connected perpendicularly to said base; a plate mounted universally on said shaft, a plurality of horizontally extending means rotatably mounted about said shaft between said base and said plate, each of said rotatable means being rotatable relative to each other whereby desired azimuthal positions of each of said rotatable means may be assumed; vertically extensible radially movable means carried by each of said rotatable means adapted to support said plate so as to form an angle with the horizontal equal to the dip of the subsurface boundary; a pointer rigidly connected to said shaft; and means provided with scales attached to said plate adapted to cooperate with said pointer for indicating the angle of dip of said subsurface boundary and for determining its depth.

3. An apparatus in accordance with claim 2 wherein said rotatable means includes at least two horizontal arms graduated to indicate distances of said seismic spreads from said shot point and wherein said vertically extensible means includes extensible tubes graduated to indicate the vertical distances of points on said boundary from a reference horizontal plane.

4. In an apparatus for determining the spatial position of a subsurface geologic formation boundary from seismic data obtained from seismic prospecting utilizing a shot point and seismic spreads: a base having an azimuth scale thereon; a shaft extending perpendicularly from the center of said base; four horizontally extending arms connected to said shaft, each of said arms being rotatable about said shaft to the same azimuthal direction as indicated by said azimuth scale as the azimuthal direction of a particular seismic spread utilized in obtaining said seismic data and each of said arms being graduated to indicate the distance of said seismic spread from the shot point; a tube radially movable on each of said horizontal arms and extending from said base in the same direction as said centrally located shaft, each tube having an index connected thereto to indicate the particular seismic spread length; a telescoping extension associated with each of said tubes, each of said telescoping extensions being graduated to indicate the Δt of the seismic event on the particular seismic spread, the longitudinal extremity of each tube serving to index the Δt; a first plate universally mounted upon said centrally located shaft, said plate being adapted to rest upon said telescoping sections to thus represent the plane of a reflecting subsurface; an arc member connected to said plate along the diameter thereof, said arc member having on one side thereof a zero mark with graduations for determining horizontal displacement from the shot point of a reflecting point on said subsurface being located on one side of said zero mark and graduations in terms of the dip angle of said reflecting subsurface on the other side of said zero mark, said arc member having on the other side thereof graduations for determining the vertical depth of said point on said reflecting subsurface; a pointer rigidly connected to said central shaft and forming an extension thereof; a second plate parallel to and having a center aligned with the center of said base connected to said pointer, said second plate having an azimuth scale thereon permanently aligned with the azimuth scale on said base whereby rotation of said first plate about said central shaft until the pointer is in the same vertical plane as the dip angle side of said arc member giving the dip angle of said reflecting subsurface as read from said arc member and the direction of said reflecting subsurface as read from said second plate, and rotation of said first plate until said pointer is in the same vertical plane as the horizontal displacement and vertical depth side of said arc member determining the horizontal displacement from said shot point and the vertical depth of said reflecting subsurface.

References Cited in the file of this patent

UNITED STATES PATENTS

| 2,592,422 | Hildebrandt et al. | Apr. 8, 1952 |
| 2,615,248 | Hildebrandt | Oct. 28, 1952 |

OTHER REFERENCES

Geophysics, vol. 18, October 1953, pages 938 and 939.